United States Patent
Yamaguchi et al.

(10) Patent No.: US 6,623,892 B1
(45) Date of Patent: Sep. 23, 2003

(54) NONAQUEOUS ELECTROLYTE BATTERY

(75) Inventors: Akira Yamaguchi, Fukushima (JP); Hidetoshi Ito, Fukushima (JP); Atuo Omaru, Fukushima (JP); Masayuki Nagamine, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/594,779

(22) Filed: Jun. 16, 2000

(30) Foreign Application Priority Data

Jun. 22, 1999 (JP) .......................................... P11-176008

(51) Int. Cl.$^7$ .............................................. H01M 10/24

(52) U.S. Cl. .................. 429/338; 429/231.95; 252/62.2

(58) Field of Search .......................... 429/231.95, 231.8, 429/324, 327, 330, 336, 337, 338; 252/62.2

(56) References Cited

U.S. PATENT DOCUMENTS

| | | | | |
|---|---|---|---|---|
| 3,871,915 A | * | 3/1975 | Brych | .................... 429/231.95 |
| 5,670,275 A | * | 9/1997 | Fujimoto et al. | ............ 429/218 |
| 6,159,637 A | * | 12/2000 | Shizuka et al. | ............. 429/224 |
| 6,268,080 B1 | * | 7/2001 | Fauteux et al. | ............. 429/188 |
| 6,379,846 B1 | * | 4/2002 | Terahara et al. | ........... 252/62.2 |

* cited by examiner

*Primary Examiner*—Randy Gulakowski
*Assistant Examiner*—Monique Wills
(74) *Attorney, Agent, or Firm*—Sonnenschein, Nath & Rosenthal LLP

(57) ABSTRACT

A nonaqueous electrolyte battery having improved characteristics under a heavy load environment and incorporating nonaqueous electrolytic solution which contains vinylene carbonate in a proper quantity to improve conductivity of the nonaqueous electrolytic solution so that doping/dedoping of lithium ions is performed smoothly and, therefore, the internal resistance is decreased. Hence it follows that the initial capacity of the battery is enlarged and satisfactory heavy load characteristics are realized.

10 Claims, 1 Drawing Sheet

NONAQUEOUS ELECTROLYTE BATTERY

RELATED APPLICATION DATA

The present application claims priority to Japanese Application No. P11-176008 filed Jun. 22, 1999 which application is incorporated herein by reference to the extent permitted by low.

BACKGROUND OF THE INVENTION

1. Field of the Invention

The present invention relates to a nonaqueous electrolyte batter incorporating a positive electrode, a negative electrode and a nonaqueous electrolyte.

2. Description of the Related Art

Hitherto, a nickel-cadmium battery, a lead battery or the like has been employed as a secondary battery for an electronic apparatus. Since the electronic technology has been developed in recent years, the size of the electronic apparatus has been reduced and a portable structure of the same has been employed. Therefore, raising of the energy density of the secondary battery for the electronic apparatus has been required. The nickel-cadmium battery and the lead battery suffer from unsatisfactorily low discharge voltage. Thus, a sufficiently high energy density cannot be obtained.

Therefore, so-called lithium-ion batteries have energetically been researched and developed. The lithium-ion battery is characterized in a long life against cycle operations because of a high discharge voltage and a small spontaneous discharge. The lithium-ion battery is a nonaqueous electrolyte battery incorporating a negative electrode constituted by a carbon material which pennits doping/dedoping of lithium ions. The positive electrode of the lithium-ion battery is constituted by lithium transition metal oxide expressed by general formula $LiM_xO_y$ (where M is at least of one material selected from Co, Ni, Mn, Fe, Al, V and Ti).

In the lithium battery, lithium ions are discharged from the positive electrode owing to discharge. Lithium ions above are inserted into gaps of carbon in the negative electrode so that a compound with carbon is produced. The foregoing phenomenon is called a "doping phenomenon". When the discharge is plastic film, lithium in the negative electrode is formed into lithium ions. Lithium ions are discharged from carbon so as to be returned to $LiM_xO_y$. The foregoing phenomenon is called a "dedoping phenomenon". That is, the lithium-ion battery generates electric energy owing to movement of lithium ions. The . nonaqueous electrolytic solution considerably concerns the movement of lithium ions. Note that the nonaqueous electrolytic solution is one of nonaqueous electrolytes.

To improve the characteristics of the nonaqueous electrolyte battery including the internal resistance of the battery and the initial capacity, the characteristics of the nonaqueous electrolytic solution for moving lithium ions are as well as important factors as well as the characteristics of the positive electrode and the negative electrode.

The nonaqueous electrolytic solution is exemplified by propylene carbonate, ethylene carbonate, 1,2-dimethoxyethane, 2-methyltetrahydrofuran, dimethylcarbonate, methylethyl carbonate and diethyl carbonate. The nonaqueous electrolytic solution prepared by mixing the foregoing materials permits a high dielectric constant to be obtained, causing the characteristics of the battery to be improved. Therefore, the nonaqueous electrolytic solution has widely been used.

In recent years, a battery which can be used even in an environment (hereinafter simply called a "heavy load environment") in which great energy is used has been required. That is, the characteristics of the battery (hereinafter called a "heavy load characteristics") in a heavy load environment must be improved. To improve the heavy load characteristics, also the composition of the nonaqueous electrolytic solution and the like must furthermore be investigated.

SUMMARY OF THE INVENTION

In view of the foregoing, an object of the present invention is to provide a nonaqueous electrolyte battery exhibiting satisfactory heavy load characteristics.

To achieve the foregoing object, according to one aspect of the invention, there is provided a nonaqueous electrolyte battery comprising: a negative electrode constituted by a material which permits doping/dedoping of lithium ions; a positive electrode constituted by a material containing lithium; and a nonaqueous electrolyte, wherein the nonaqueous electrolyte contains vinylene carbonate expressed by chemical formula 1:

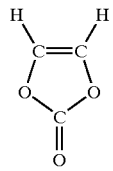

(1)

The nonaqueous electrolyte battery according to the present invention and structured as described above is capable of decreasing the internal resistance to enlarge the initial capacity. Thus, the heavy load characteristics can be improved.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
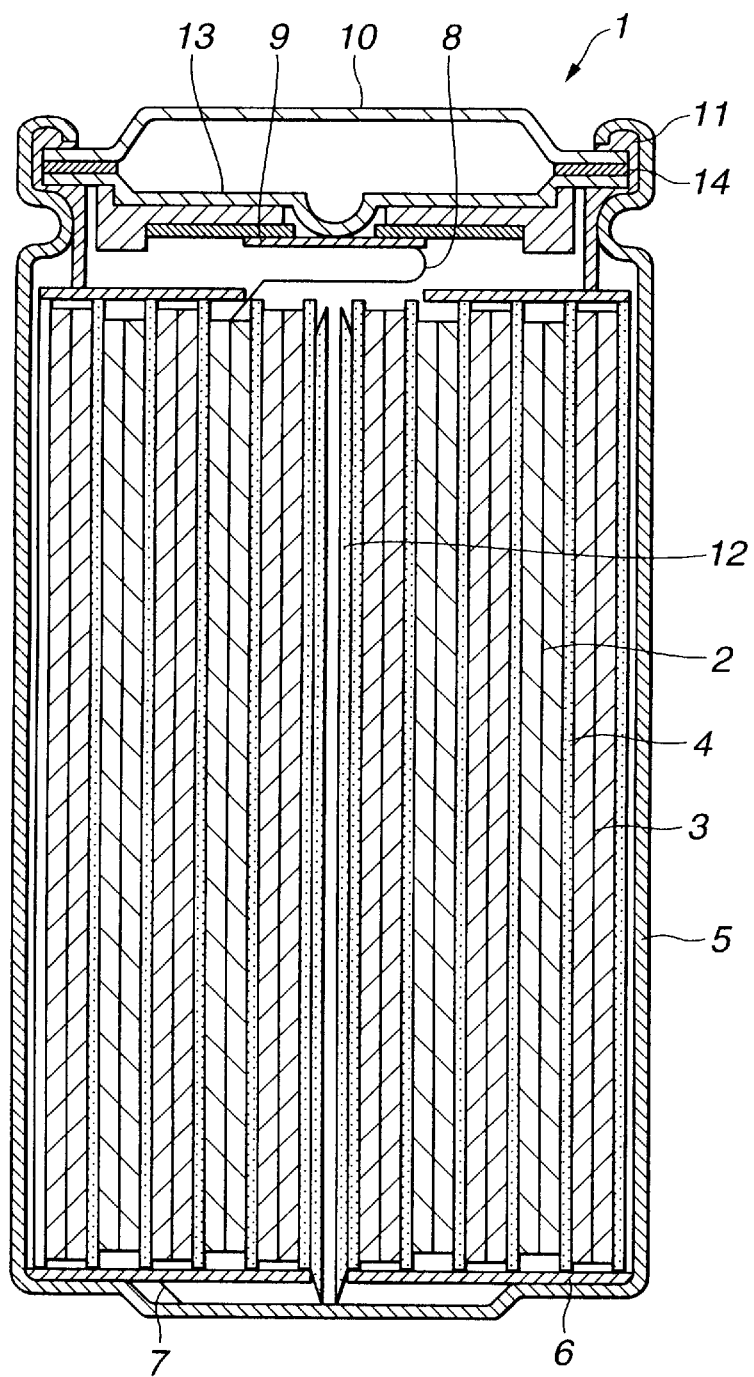
FIG. 1 is a vertical cross sectional view showing an example of the structure of a nonaqueous electrolyte battery according to the present invention.

An embodiment of the present invention will now be described.

FIG. 1 is a vertical cross sectional view showing an example of the structure of a nonaqueous electrolyte battery according to the present invention. A nonaqueous electrolyte battery 1 incorporates a wound laminate constituted by hermetically winding an elongated positive electrode 2 and an elongated negative electrode 3 through a separator 4. The wound laminate is accommodated in a battery can 5.

The positive electrode 2 can be manufactured by coating the surfaces of a collector with a positive-electrode mix containing positive-electrode active material and a binder and by drying the collector. The collector is constituted by, for example, metal foil, such as aluminum foil.

The positive-electrode active material may be a lithium composite oxide mainly composed of $LiM_xO_y$ (where M is one or more types of transition metal materials). It is preferable that the transition metal M constituting the lithium composite oxide is Co, Ni, Mn, Fe, Al, V or Ti. Specifically, the lithium composite oxide is exemplified by $LiCoO_2$, $LiNiO_2$, $LiNi_yCo_{l-z}O_2$ (where $0<z<1$) and $LiMn_2O_4$. The lithium composite oxide is able to generate a high voltage. Thus, the lithium composite oxide is an excellent positive-electrode active material excellent in the energy density. A plurality of the foregoing positive-electrode active materials may be combined to constitute the positive electrode 2.

The binder for the positive-electrode mix may be a known binder which is employed in a usual positive-electrode mix for the battery Moreover, a known additive, such as a conductive material, may be added to the positive-electrode mix.

The negative electrode 3 can be manufactured by coating a collector with a negative-electrode mix containing a negative-electrode active material and a binder and by drying the collector. The collector may be metal foil, such as copper foil.

It is preferable that the material of the negative electrode is lithium, a lithium alloy or a material which permits doping/dedoping of lithium. The material which permits doping/dedoping of lithium may be a carbon material such as a non-graphitizable carbon material or a graphite material. Specifically, any one of the foregoing carbon materials may be employed: pyrocarbon, cokes, graphite, vitreous carbon fiber, material obtained by baking an organic polymer, carbon fiber and active carbon. Cokes are exemplified by pitch cokes, needle cokes and petroleum cokes. The material obtained by baking the organic polymer is a material obtained by carbonizing phenol resin or furan resin at a proper temperature As the material which permits doping/dedoping of lithium, a polymer, such as polyacetylene or polypyrrole, or an oxide, such as $SnO_2$ may be employed as well as the foregoing carbon material. As the lithium alloy, a lithium-aluminum alloy may be employed.

The binder which is contained in the negative-electrode mix may be a known binder for use in a negative-electrode mix of a usual lithium-ion battery. Moreover, a known additive may be added to the negative-electrode mix.

The nonaqueous electrolytic solution is prepared by dissolving an electrolyte in a nonaqueous solvent.

The electrolytic solution may be a known electrolyte for use in a usual electrolytic solution for a battery. The electrolyte is exemplified by any one of the following lithium salts: $LiPF_6$, $LiBF_4$, $LiAsF_6$, $LiClO_4$, $LiCF_3SO_3$, $LiN(SO_2CF_3)_2$, $LiC(SO_2CF_3)_3$, $LiAlCl_4$, $LiSiF_6$, $LiB(C_6H_5)_4$, $LiCl$, $LiCl$, $LiBr$, $CH_3SO_3Li$ and $CF_3SO_3Li$. In particular, it is preferable that $LiPF_6$ or $LiBF_4$ is employed from a viewpoint oxidation stability.

It is preferable that the electrolyte is dissolved in the nonaqueous solvent at a concentration of 0.1 mol/l to 3.0 mol/l, more preferably 0.5 mol/l to 2.0 mol/l.

The nonaqueous solvent may be any one of a variety of nonaqueous solvent materials which have been employed in the nonaqueous electrolytic solution. The nonaqueous solvent is exemplified by propylene carbonate, ethylene carbonate, dimethoxyethane, dimethyl carbonate, diethyl carbonate, γ-butyrolactone, tetrahydrofuran, 2-methyltetrahydrofuran, 1,3-dioxolane, 4-methyl-1,3-dioxolane, diethylether, sulfolane, methylsulfolane, methylsulfolane butyrate, acetonitrile, propione nitrile and methyl propionate. The foregoing nonaqueous solvent may be employed solely or a plurality of materials may be mixed.

The nonaqueous electrolyte battery according to the present invention incorporates the nonaqueous electrolytic solution which contains vinylene carbonate. The constitutional formula of vinylene carbonate is as expressed in chemical formula 2.

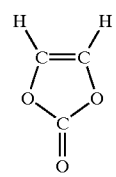

(2)

The quantity of vinylene carbonate contained in the nonaqueous electrolytic solution satisfies a range not smaller than 1 ppm and smaller than 100 ppm. In particular, the preferred quantity satisfies a range not smaller than 2 ppm nor larger than 98 ppm. As described later in the examples, a satisfactory effect to decrease the internal resistance cannot be obtained when the quantity of vinylene carbonate is smaller than 1 ppm. In the foregoing case, the required initial capacity and heavy load characteristics cannot be obtained. When the quantity is 100 ppm or larger, the internal resistance is undesirably increased.

The nonaqueous electrolyte battery 1 is manufactured as follows.

The positive electrode 2 is manufactured by uniformly applying the positive-electrode mix containing the positive-electrode active material and the binder to the surfaces of metal foil, such as aluminum foil which is formed into the positive-electrode collector. Then, the metal foil is dried so that the positive-electrode active material layer is formed so that the positive electrode 2 is manufactured. The binder for the positive-electrode mix may be a known binder. A known additive may be added to the positive-electrode mix.

The negative electrode 3 is manufactured by uniformly applying the negative-electrode mix containing the negative-electrode active material and the binder to the surfaces of metal foil, such as copper foil, which is formed into the negative-electrode collector. Then, the metal foil is dried so that the negative-electrode active material layer is formed. Thus, the negative electrode 3 is manufactured. The binder for the foregoing negative-electrode mix may be a known binder. A known additive may be added to the negative-electrode mix.

The obtained positive electrode 2 and the negative electrode 3 are brought into hermetic contact with each other through the separator 4 constituted by, for example, a small-pore polypropylene film. Then, the laminate is wound many times into a spiral shape. Thus, a wound member is constituted.

Then, an insulating plate 6 is inserted into the bottom portion of the iron battery can 5 having the inner surface applied with nickel plating. Then, the wound member is accommodated. To realize collection of electric currents of the negative electrode 3, an end of a negative-electrode lead 7 constituted by, for example, nickel, is brought into hermetic contact with the negative electrode 3. Another end of the negative-electrode lead 7 is welded to the battery can 5. As a result, the battery can 5 is electrically connected with the negative electrode 3 so as to be an external negative electrode of the nonaqueous electrolyte battery 1. To collect electric currents of the positive electrode 2, an end of a positive-positive lead 8 constituted by, for example, aluminum, is joined to the positive electrode 2. Another end of the positive-positive lead 8 is electrically connected to a battery cover 10 through a current-breaking thin plate 9. The current-breaking thin plate 9 breaks an electric current according to the internal pressure of the battery. As a result, the battery cover 10 is electrically connected to the positive electrode 2 so as to be an external positive electrode of the nonaqueous electrolyte battery 1.

Then, the nonaqueous electrolytic solution is enclosed into the battery can 5. The nonaqueous electrolytic solution is prepared by dissolving the electrolyte in the nonaqueous solvent.

Then, the battery can 5 is caulked through the insulating sealing gasket 11 applied with asphalt so that the battery cover 10 is secured. As a result, the cylindrical nonaqueous electrolyte battery 1 is manufactured.

As shown in FIG. 1, the nonaqueous electrolyte battery 1 incorporates a center pin 12 which is connected to the negative-electrode lead 7 and the positive-positive lead 8. Moreover, a safety-valve unit 13 is provided which degasses the inside portion of the battery when the pressure in the battery has been raised to a level higher than a predetermined level. In addition, a PTC element 14 is provided which prevents increase of the temperature in the battery.

The nonaqueous electrolyte battery 1 according to this embodiment may be formed into a cylindrical shape, a square shape, a coin shape or a button shape. The shape is not limited particularly. Also the size may be determined arbitrarily, for example, a thin type or a large-size type.

Although the nonaqueous electrolyte battery according to this embodiment incorporates the nonaqueous electrolytic solution, the present invention is not limited to the foregoing arrangement. The present invention may be applied to a case in which a so-called polymer gel electrolyte is used as the nonaqueous electrolyte which contains a polymer, such as polyvinylidene fluoride and polyacrylonitrile and the nonaqueous solvent. The present invention may be applied to a primary battery and a secondary battery.

EXAMPLES

Examples of the present invention will now be described.

Example 1

Graphite powder for constituting the negative electrode was prepared.

Initially, 100 parts by weight of coal cokes were added with 30 parts by weight of coal tar pitch which was the binder. Then, the materials were mixed with each other at about 100° C. Then, the mixture was compressed and molded into a required shape by operating a press. Thus, precursor of a molded carbon was obtained. The precursor of the molded carbon was subjected to heat treatment at 1000° C. or lower so that the molded carbon was obtained.

The molded carbon was impregnated with binder pitch dissolved at 200° C. or lower, and then a pitch impregnation step/a baking step was repeated several times so that the heat treatment was performed at 1000° C. or lower. Then, the molded carbon was subjected to heat treatment at 2800° C. in an inactive gas flow so that a molded graphite member was obtained. Then, the molded member was pulverized and classified so that graphite powder was obtained.

Graphite powder above was analyzed by the X-ray structural analysis method, thus resulting in that the spacing of the planes (002) was 0.337 nm. Moreover, the thickness of the axis C of the plane (002) was 50.0 nm. A pycnometer method was employed so that the true density was 2.23 g/cm$^3$. A Brunauer-Emmett-Teller method (the BET method) was employed so that the specific area was 1.6 m$^2$/g. The laser analysis was performed so that the mean grain size of the grain size distribution was 33.0 μm. The 10 % cumulative grain size was 13.3 μm, 50% cumulative grain size was 30.6 μm and the 90% cumulative grain size was 55.7 μm. The laser analysis was performed so that the mean breaking strength of the graphite powder was 7.1 kgf/mm$^2$. The bulk density was measured by the following method and the bulk density was 0.98 g/cm$^3$.

Method of Measuring Bulk Density

The bulk density was measured by a method conforming to JIS K-1469.

A measuring cylinder having a capacity of 100 cm$^3$, the mass of which was previously measured was inclined, and then sample powder in a quantity of 100 cm$^3$ was charged gradually by using a spoon. The overall mass was measured with a minimum scale value of 0.1 g. The mass of the measuring cylinder was subtracted from the measured mass so that mass M of sample powder was detected.

A cork stopper was fitted to the measuring cylinder into which sample powder was introduced. The measuring cylinder in the foregoing state was dropped 50 times from a height of about 5 cm onto a rubber plate. Thus, sample powder in the measuring cylinder was compressed. Thus, reading of the volume V of the compressed sample powder was permitted. Then, the following equation 1 was used to calculate the bulk density:

$$D = W/V \qquad \text{(Equation 1)}$$

where D: bulk density (g/cm$^3$)

W: mass (g) of sample powder in the measuring cylinder

V: volume (cm$^3$) of sample powder in the measuring cylinder after 50 times of dropping.

The foregoing graphite powder was used to manufacture the negative electrode. The foregoing sample powder in a quantity of 90 parts by weight and 10 parts by weight of polyvinylidene fluoride (PVDF) were mixed with each other. Then, the mixture was dispersed in N-methylpyrolidone which was the solvent so that slurry was obtained. Thus, negative-electrode mix slurry was obtained. The negative-electrode mix slurry was uniformly applied to the two sides of elongated copper foil which was the negative-electrode collector and having a thickness of 10 μm. Then, the copper foil was dried, and the compression and molding were performed under a predetermined pressure. Thus, an elongated negative electrode was manufactured.

Then, the positive electrode was manufactured. Mixing of 0.5 mol of lithium carbonate and 1 mol of cobalt carbonate was performed. The mixture was baked at 900° C. for 5 hours in the air. A baked substance was analyzed by the X-ray structure analysis method. A result coincided with the peak of LiCoO$_2$ registered to the JCPDS file. Thus, identification was made that the baked substance was LiCoO$_2$. The obtained LiCoO$_2$ was pulverized until the 50% grain size was 15 μm which was obtained by the laser diffraction method. Thus, LiCoO$_2$ powder was obtained.

Then, 95 parts by weight of LiCoO$_2$ powder and 5 parts by weight of lithium carbonate powder were mixed with each other. Then, 91 parts by weight of the mixture, 6 parts by weight of flake graphite which was the conductive material and 3 parts by weight of PVDF which was the binder were mixed with one another. Then, the mixture was dispersed in N-methylpyrolidone which was the solvent so that slurry was obtained. Thus, positive-electrode mix slurry was obtained. The positive-electrode mix slurry was uniformly applied to the two sides of elongated aluminum foil which is the positive electrode collector and having a thickness of 20 μm. Then, the film foil was dried, and then a predetermined pressure was applied to compress and mold the structure. Thus, the elongated positive electrode was manufactured.

Then, the negative electrode, the separator, the positive electrode and the separator were laminated in this order. Then, the laminate was wound many times so that a wound electrode was obtained. The separator was small-pore polypropylene film having a thickness of 25 μm.

The thus-manufactured wound electrode was accommodate in the battery can applied with nickel plating. An insulating member was placed on each of the upper and lower surfaces of the wound electrode. The positive electrode lead constituted by aluminum was extended from the positive electrode collector so as to be welded to the battery cover. Moreover, the negative electrode lead constituted by nickel was extended from the negative electrode collector so as to be welded to the battery can.

Then, the nonaqueous electrolytic solution was charged into the battery can. The nonaqueous electrolytic solution had a composition that vinylene carbonate was, at a concentration of 61 ppm, contained in a mixture of mixed solvent of ethylene carbonate (EC) and dimethyl carbonate (DMC) at the same volume and $LiPF_6$ mixed at a ratio of 1.0 mol/l.

Then, the battery can was caulked through the insulating sealing gasket having the surface coated with asphalt. Thus, the safety unit having the current breaking mechanism and the PTC element were secured. Then, airtightness in the battery was maintained. As a result, a cylindrical nonaqueous electrolyte secondary battery having a diameter of 18 mm and a height of 65 mm was manufactured.

The manufactured battery was electrically charged. The charging operation was performed under conditions that the temperature was 23° C., the constant electric current was 0.5 A and the highest voltage was 4.2 V. The charge was performed with the constant electric current and constant voltage for 7 hours. Then, the characteristics of the battery were examined. Initially, the AC impedance was measured under conditions that the frequency was 1 KHz and the applied voltage was 10 mV. Thus, the internal resistance of the battery was measured. Then, discharge was performed with a constant current of 0.2 A until the terminated voltage was 2.75 V. Thus, the initial capacity was examined. Then, discharge was performed under conditions that the temperature was 23° C. and a constant current of 0.2 A was supplied until the terminated voltage was 2.75 V. Thus, the initial capacity was examined. Then, discharge was performed at 23° C. by supplying a constant current of 5A until the terminated voltage was 2.75 V. Thus, the heavy load characteristics were examined.

Example 2

A cylindrical nonaqueous electrolytic solution secondary battery was manufactured similarly to Example 1 except for the concentration of the vinylene carbonate contained in the nonaqueous electrolytic solution in the battery which was 98 ppm. Then, the battery was charged, and then the characteristics of the battery were examined.

Example 3

A cylindrical nonaqueous electrolytic solution secondary battery was manufactured similarly to Example 1 except for the concentration of the vinylene carbonate contained in the nonaqueous electrolytic solution in the battery which was 95 ppm. Then, the battery was charged, and then the characteristics of the battery were examined.

Example 4

A cylindrical nonaqueous electrolytic solution secondary battery was manufactured similarly to Example 1 except for the concentration of the vinylene carbonate contained in the nonaqueous electrolytic solution in the battery which was 72 ppm. Then, the battery was charged, and then the characteristics of the battery were examined.

Example 5

A cylindrical nonaqueous electrolytic solution secondary battery was manufactured similarly to Example 1 except for the concentration of the vinylene carbonate contained in the nonaqueous electrolytic solution in the battery which was 33 ppm. Then, the battery was charged, and then the characteristics of the battery were examined.

Example 6

A cylindrical nonaqueous electrolytic solution secondary battery was manufactured similarly to Example 1 except for the concentration of the vinylene carbonate contained in the nonaqueous electrolytic solution in the battery which was 8 ppm. Then, the battery was charged, and then the characteristics of the battery were examined.

Example 7

A cylindrical nonaqueous electrolytic solution secondary battery was manufactured similarly to Example 1 except for the concentration of the vinylene carbonate contained in the nonaqueous electrolytic solution in the battery which was 2 ppm. Then, the battery was charged, and then the characteristics of the battery were examined.

Example 8

A cylindrical nonaqueous electrolytic solution secondary battery was manufactured similarly to Example 1 except for the concentration of the vinylene carbonate contained in the nonaqueous electrolytic solution in the battery which was 1 ppm. Then, the battery was charged, and then the characteristics of the battery were examined.

Example 9

A cylindrical nonaqueous electrolytic solution secondary battery was manufactured similarly to Example 1 except for the concentration of the vinylene carbonate contained in the nonaqueous electrolytic solution in the battery which was 20%. Then, the battery was charged, and then the characteristics of the battery were examined.

Example 10

A cylindrical nonaqueous electrolytic solution secondary battery was manufactured similarly to Example 1 except for the concentration of the vinylene carbonate contained in the nonaqueous electrolytic solution in the battery which was 1.2%. Then, the battery was charged, and then the characteristics of the battery were examined.

Example 11

A cylindrical nonaqueous electrolytic solution secondary battery was manufactured similarly to Example 1 except for the concentration of the vinylene carbonate contained in the nonaqueous electrolytic solution in the battery which was 1223 ppm. Then, the battery was charged, and then the characteristics of the battery were examined.

Example 12

A cylindrical nonaqueous electrolytic solution secondary battery was manufactured similarly to Example 1 except for the concentration of the vinylene carbonate contained in the nonaqueous electrolytic solution in the battery which was 640 ppm. Then, the battery was charged, and then the characteristics of the battery were examined.

Example 13

A cylindrical nonaqueous electrolytic solution secondary battery was manufactured similarly to Example 1 except for the concentration of the vinylene carbonate contained in the nonaqueous electrolytic solution in the battery which was 250 ppm. Then, the battery was charged, and then the characteristics of the battery were examined.

Example 14

A cylindrical nonaqueous electrolytic solution secondary battery was manufactured similarly to Example 1 except for the concentration of the vinylene carbonate contained in the nonaqueous electrolytic solution in the battery which was 120 ppm. Then, the battery was charged, and then the characteristics of the battery were examined.

Example 15

A cylindrical nonaqueous electrolytic solution secondary battery was manufactured similarly to Example 1 except for the concentration of the vinylene carbonate contained in the nonaqueous electrolytic solution in the battery which was 100 ppm. Then, the battery was charged, and then the characteristics of the battery were examined.

Example 16

A cylindrical nonaqueous electrolytic solution secondary battery was manufactured similarly to Example 1 except for the concentration of the vinylene carbonate contained in the nonaqueous electrolytic solution in the battery which was 0.9 ppm. Then, the battery was charged, and then the characteristics of the battery were examined.

Example 17

A cylindrical nonaqueous electrolytic solution secondary battery was manufactured similarly to Example 1 except for the concentration of the vinylene carbonate contained in the nonaqueous electrolytic solution in the battery which was 0.7 ppm. Then, the battery was charged, and then the characteristics of the battery were examined.

Comparative Example 1

A cylindrical nonaqueous electrolytic solution secondary battery was manufactured similarly to Example 1 except for an arrangement that the nonaqueous electrolytic solution in the battery did not contain vinylene carbonate. Then, the battery was charged, and then the characteristics of the battery were examined.

Example 18

The negative electrode was manufactured by using non-graphitizable carbon as a substitute for graphite. The negative electrode 1 was manufactured by the following method. Functional groups in which petroleum pitch contained oxygen was introduced by 10% to 20% (so-called oxygen crosslinking was performed). Then, a baking operation was performed at 1000° C. in an inactive gas flow so that non-graphitizable carbon was obtained. Non-graphitizable carbon was pulverized and classified so that non-graphitizable carbon powder was obtained.

Non-graphitizable carbon powder has a structure that the spacing between planes (002) was 3.76 angstrom as a result of the X-ray diffraction measurement. The pycnometer method was employed so that the true specific gravity was 1.58 g/cm$^3$. The laser diffraction method was employed so that the mean grain size was 10 $\mu$m.

A cylindrical nonaqueous electrolytic solution secondary battery was manufactured similarly to Example 1 except for the structure that non-graphitizable carbon powder was employed as a substitute for graphite powder and the concentration of the vinylene carbonate contained in the non-aqueous electrolytic solution in the battery which was 90 ppm. Then, the battery was charged, and then the characteristics of the battery were examined.

Comparative Example 2

A cylindrical nonaqueous electrolytic solution secondary battery was manufactured similarly to Example 18 except for the structure that the nonaqueous electrolytic solution in the battery did not contain vinylene carbonate. Then, the battery was charged, and then the characteristics of the battery were examined.

Results of Examples 1 to 18 and Comparative Example 1 and 2 were shown in Table 1.

TABLE 1

| | Substance Employed to Manufacture Negative Electrode | Content of Vinylene Carbonate in Battery |
|---|---|---|
| Example 1 | graphite powder | 61 ppm |
| Example 2 | | 98 ppm |
| Example 3 | | 95 ppm |
| Example 4 | | 72 ppm |
| Example 5 | | 33 ppm |
| Example 6 | | 8 ppm |
| Example 7 | | 2 ppm |
| Example 8 | | 1 ppm |
| Example 9 | | 20% |
| Example 10 | | 1.2% |
| Example 11 | | 1223 ppm |
| Example 12 | | 640 ppm |
| Example 13 | | 250 ppm |
| Example 14 | | 120 ppm |
| Example 15 | | 100 ppm |
| Example 16 | | 0.9 ppm |
| Example 17 | | 0.7 ppm |
| Comparative Example 1 | | 0 ppm |
| Example 18 | non-graphitizable carbon powder | 90 ppm |
| Comparative Example 2 | | 0 ppm |

| | Initial Capacity (mAh) | Heavy Load Characteristics (mAh) | Resistance in Battery (mΩ) |
|---|---|---|---|
| Example 1 | 1610 | 950 | 59 |
| Example 2 | 1612 | 612 | 68 |
| Example 3 | 1611 | 640 | 66 |
| Example 4 | 1609 | 852 | 61 |
| Example 5 | 1608 | 842 | 63 |
| Example 6 | 1605 | 603 | 69 |
| Example 7 | 1601 | 540 | 72 |

TABLE 1-continued

| Example 8 | 1601 | 501 | 74 |
|---|---|---|---|
| Example 9 | 1600 | 400 | 103 |
| Example 10 | 1601 | 481 | 82 |
| Example 11 | 1599 | 485 | 80 |
| Example 12 | 1598 | 486 | 79 |
| Example 13 | 1601 | 488 | 79 |
| Example 14 | 1602 | 491 | 78 |
| Example 15 | 1606 | 498 | 75 |
| Example 16 | 1600 | 490 | 79 |
| Example 17 | 1599 | 490 | 79 |
| Comparative Example 1 | 1600 | 481 | 83 |
| Example 18 | 1500 | 610 | 68 |
| Comparative Example 2 | 1500 | 453 | 85 |

As can be understood from Table 1, when graphite powder was employed to manufacture the negative electrode, the initial capacity of each of Examples 1 to 8 each containing vinylene carbonate in a proper quantity was enlarged as compared with Comparative Example 1 which did not contain vinylene carbonate. Thus, the internal resistance was decreased and the heavy load characteristics were improved.

Also in the case where the non-graphitizable carbon was employed to manufacture the negative electrode, Example 18 containing vinylene carbonate had the internal resistance which was lower than that of the Comparative Example 2 which did not contain vinylene carbonate. Moreover, the heavy load characteristics were improved.

The reason for this can be considered that the products of the decomposition of the vinylene carbonate in a small quantity improved the ion conductivity in the nonaqueous electrolytic solution. Thus, doping/dedoping of lithium ions was smoothly performed.

When Examples 9 to 15 contained vinylene carbonate in a large quantity. The internal resistance of the battery was increased, the heavy load characteristics to deteriorate. When a large quantity of 20% was contained as in the comparative example, the internal resistance of the battery was excessively increased. Thus, the initial capacity was considerably reduced. Thus, a satisfactory effect was not obtained when vinylene carbonate was contained in a quantity not smaller than 100 ppm.

The reason for this can be considered that the products of decomposition of vinylene carbonate produced in a large quantity caused the viscosity of the nonaqueous electrolytic solution to be raised. Thus, smooth doping/dedoping of lithium ions was inhibited.

Examples 16 and 17 had the structure that the content of vinylene carbonate was smaller than 1 ppm. In the foregoing case, a satisfactory effect was not obtained from contained vinylene carbonate.

As can be understood from examples and comparative examples, the proper quantity of vinylene carbonate to be contained in the nonaqueous electrolytic solution is 1 ppm or greater and smaller than 100 ppm, more preferably 2 ppm or greater and smaller than 98 ppm.

As described above, the nonaqueous electrolyte battery according to the present invention can be used in a heavy load environment.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous electrolyte battery comprising:
   a negative electrode constituted by a material which permits doping/dedoping of lithium ions;
   a positive electrode constituted by a metal containing lithium; and
   a nonaqueous electrolyte, wherein
      said nonaqueous electrolyte contains vinylene carbonate expressed by the following chemical formula:

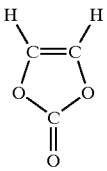

in an amount in the range of from 1 ppm to smaller than 100 ppm.

2. A nonaqueous electrolyte battery according to claim 1, wherein said nonaqueous electrolyte is obtained by dissolving lithium salt in nonaqueous solvent which contains at least cyclic ester and/or chain ester.

3. A nonaqueous electrolyte battery according to claim 1, wherein a carbon material is employed as said material which permits doping/dedoping of lithium ions.

4. A nonaqueous electrolyte battery according to claim 3, wherein said carbon material is graphite.

5. A nonaqueous, electrolyte battery according to claim 3, wherein said carbon material is non-graphitizable carbon.

6. A nonaqueous electrolyte battery comprising:
   a negative electrode incorporating a negative-electrode collector which has two sides on which a material which permits doping/dedoping of lithium ions is formed;
   a positive electrode incorporating a positive-electrode collector having two sides on which a substance containing lithium is formed;
   a separator; and
   a nonaqueous electrolyte, wherein
      said nonaqueous electrolyte contains vinylene carbonate expressed by the following chemical formula:

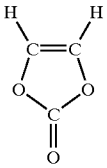

in an amount in the range of from 1 ppm to smaller than 100 ppm.

7. A nonaqueous electrolyte battery according to claim 6, wherein said nonaqueous electrolyte is obtained by dissolving lithium salt in nonaqueous solvent which contains at least cyclic ester and/or chain ester.

8. A nonaqueous electrolyte battery according to claim 6, wherein a carbon material is employed as said material which permits doping/dedoping of lithium ions.

9. A nonaqueous electrolyte battery according to claim 8, wherein said carbon material is graphite.

10. A nonaqueous electrolyte battery according to claim 8, wherein said carbon material is non-graphitizable carbon.

* * * * *